United States Patent [19]
Hoenel et al.

[11] Patent Number: 5,374,754
[45] Date of Patent: Dec. 20, 1994

[54] REACTION PRODUCTS OF DIALKYLTIN OXIDE AND POLYHYDRIC PHENOLS

[75] Inventors: Michael Hoenel, Wiesbaden; Peter Ziegler, Mainz; Susanne Wehner, Villmar; Klaus Kueper, Kottingbrunn; Achim Voelker, Wiesbaden, all of Germany

[73] Assignee: Hoechst AG, Germany

[21] Appl. No.: 58,934

[22] Filed: May 7, 1993

[30] Foreign Application Priority Data

May 11, 1992 [DE] Germany .............................. 4215479

[51] Int. Cl.$^5$ .............................................. C07F 7/22
[52] U.S. Cl. ................................................ 556/89
[58] Field of Search ............................................ 556/89

[56] References Cited

U.S. PATENT DOCUMENTS

| | | | |
|---|---|---|---|
| 3,099,668 | 7/1963 | Zweigle et al. | 556/89 |
| 3,221,036 | 11/1965 | Weissenberger | 556/83 |
| 3,856,727 | 12/1974 | Seki et al. | 524/89 |
| 5,176,804 | 1/1993 | Buttner et al. | 204/181.7 |

FOREIGN PATENT DOCUMENTS

| | | |
|---|---|---|
| 0436135 | 12/1990 | European Pat. Off. . |
| 1487752 | 7/1966 | France . |
| 957841 | 5/1964 | United Kingdom . |

*Primary Examiner*—Johann Richter
*Assistant Examiner*—Catherine S. K. Scalzo
*Attorney, Agent, or Firm*—Bierman and Muserlian

[57] ABSTRACT

Reaction products of dialkyltin oxide and polyhydric phenols.

These reaction products are suitable as catalysts with improved properties for curing coating binders.

3 Claims, No Drawings

REACTION PRODUCTS OF DIALKYLTIN OXIDE AND POLYHYDRIC PHENOLS

From EP-B-0 261 486 it is already known, in cationic coating binders which are cured, i.e. crosslinked, by transesterification, transamidation, transurethanization or by the reaction of terminal double bonds, to use as the catalyst condensation products of dialkyltin oxide and phenols. However, it has become evident that these condensation products are not sufficiently stable, leading to a decrease in catalytic activity.

It has now been found that reaction products of dialkyltin oxide with polyhydric phenols do not have these disadvantages and, in addition, possess an outstanding catalytic activity (constant over time).

The invention relates to reaction products of dialkyltin oxide and polyhydric phenols and to curable mixtures comprising these reaction products.

Suitable polyhydric phenols for preparing these reaction products are preferably compounds of the following formulae I to IV:

$$HO-\text{C}_6\text{H}_{3}(R)_a(OH)_m \quad (I)$$

in which

R is $C_1$-$C_{18}$-alkyl, preferably $C_1$-$C_4$-alkyl, phenyl, $C_1$-$C_{18}$-alkylphenyl or $C_5$-$C_6$-cycloalkyl,
m is a number from 1 to 5, preferably 1 or 2, and
a is a number from zero to 4, the value of a being less than or equal to the difference from 5 minus m;

$$HO-[\text{C}_6\text{H}_3\text{M}-A-\text{C}_6\text{H}_3\text{M}]_a(OH)_n \quad (II)$$

where n and a are 1 or 2,
M is a group of the formula =CH—, a heteroatom, preferably a nitrogen atom,
A is a direct bond or a group of the formulae

—CH$_2$—, —C(CH$_3$)$_2$—, —CH(COB)—, —C(CH$_3$)(CH$_2$CH$_2$—COB)—,

—SO—, —S—, —SO$_2$—, —S—S—, —CO—,

B is a hydroxyl group or a group of the formula

—NH—(CH$_2$)$_b$—N(R)$_2$  or  —N(CR$_2$)(CH$_2$)$_b$N—(CH$_2$)$_b$—N=CR$_2$ b is a number from 1 to 4, preferably 2 or 3;

$$\text{naphthalene-}(OH)_x \quad (III)$$

in which
X is 2 or 3;

$$HO-\text{naphthalene-}(OH)_n \quad (IV)$$

in which n is 1 or 2;

$$(HO)_y-\text{C}_6\text{H}_{3}(Z)-\text{C}_6\text{H}_{3}(Z)-(OH)_{y'} \quad (V)$$

in which y and y' are each 0, 1 or 2, the sum of y and y' being at least two and
Z is a group of the formula =CH—  or  >C=O.

Examples of polyhydric phenols are the following compounds: phloroglucinol, pyrogallol, hydroxyhydroquinone, 1,4-dihydroxynaphthalene and its positional isomers, for example: the 1,2-, 1,3-, 1,5- and 1,6-isomers; 2,2'-dihydroxybiphenyl and its positional isomers, for example the 4,4'- and 2,5- isomers, 3,3'-dihydroxy-2,2'-bipyridyl, hydroquinone, resorcinol, dihydroxyanthraquinone (e.g. quinizarine, anthraflavic acid), pyrocatechol, bis (2-hydroxyphenyl)methane, bis (4-hydroxyphenyl)methane, 2,2 -bis (2-hydroxyphenyl) propane, 2,2-bis (4hydroxyphenyl)propane (bisphenol A), 4,4-bis(4-hydroxyphenyl)valeric acid and its amide, bis(4-hydroxyphenyl) sulfone, bis(4-hydroxyphenyl) sulfide, and 2,2-bis (4-hydroxyphenyl)acetic acid and its amide.

The phenols mentioned can be used individually or in a mixture. Bisphenol A and N,N-dimethylaminopropyl-bis(4-hydroxyphenyl)acetamide are particularly preferred.

The preparation of the reaction products of dialkyltin oxide and polyhydric phenols is carried out by heating the reactants at from 80° to 200° C., preferably 80° to 150° C., in an organic solvent which is immiscible or only partly miscible with water and serves as the entraining agent for removing the water of reaction in circulation. At the end of the reaction the solvent is removed by filtration and the reaction product is washed with a further solvent.

Examples of suitable entraining agents for removing the water in circulation are aromatic solvents, for example benzene, toluene, xylene (or isomer mixture), Solvesso; ketones, for example methyl isobutyl ketone, methyl amyl ketone and cyclohexanone, or aliphatic solvents, for example n-heptane and cyclohexane.

Suitable solvents for washing the final reaction product are preferably those which dissolve the phenols used and have a boiling point of below 200° C., for example acetone, ethyl acetate, ethoxypropyl acetate, ethoxyethyl propionate, tetrahydrofuran, methylene chloride, diglycol dimethyl ether, N-methylpyrrolidone or else the solvents described above as entraining agents.

The molar ratio of dialkyltin oxide, preferably dibutyltin oxide (DBTO) to phenol is from 1:1.2 to 1:0.01, preferably from 1:0.75 to 1:0.16. For the difunctional phenols which are preferred the ratio is from 1:0.75 to 1:0.2. If appropriate, a proportion of monohydric phenols may also be used in the preparation of the reaction products of dialkyltin oxide and phenol. In this case, the molar ratio (ratio of dialkyltin oxide to the sum of all the phenols) is from 1:1 to 1:0.4, and the ratio of polyhydric phenol to monohydric phenol is from 3:1 to 0.33:1. In this respect the amount of all the phenolic OH groups in the polyhydric phenols must in all cases be greater than the amount of the phenolic OH groups in the monohydric phenols. This variant is suitable in particular for the preparation of those catalysts which are prepared on the basis of the phenols defined in formula II, if these phenols carry the nitrogen-containing groups listed under B. Suitable monohydric phenols are in particular compounds of the formula I in which m is 0.

Calculated with respect to the content of metallic tin, the catalysts thus obtained are employed in amounts of from 0.1 to 5% by weight, preferably 0.3 to 1.5% by weight, and in particular 0.5 to 1% by weight based on the solids content of the binder. The catalyst can be added directly to the binder. However, it is also possible first to incorporate the catalyst into a pigment paste which is then added to the coating formulation, or the catalyst is suspended in a paste resin and this paste resin is combined with the coating formulation.

Suitable binders in the curable mixtures are all resins known for this purpose, and preferably those binders which by addition of acids are soluble or emulsifiable in water and are therefore suitable for use in electrodeposition coating (CED - cathodic electrodeposition). These catalysts are especially suitable for CED binders which carry isocyanate-reactive groups in the form of —$NH_2$, —NH—, —OH, or —SH groups, these groups being crosslinked with one another by so-called blocked polyisocyanates. Suitable binders are polymers, polycondensation products or polyaddition compounds which contain groups which are reactive with isocyanate groups, such as hydroxyl and/or amino groups, at least two of these groups being present on average per molecule.

The functionality (NH, $NH_2$, OH) of these polymers may, in accordance with the sum of the amine number (relating only to NH and $NH_2$) and hydroxyl number, be for example between 20–1500, preferably between 100–1000 and particularly preferably between 100–500.

Examples of synthetic resins containing OH groups (polyols) are polyether-polyols, polyacetal-polyols, polyester amide polyols, epoxy resin polyols or reaction products thereof with $CO_2$, phenolic resin polyols, polyurea-polyols, polyurethane-polyols, partially hydrolysed homo- and copolymers of vinyl esters, partially acetalized polyvinyl alcohols, polyester-polyols or acrylate resin-polyols. Also suitable here are OH-containing phenolic, urea or melamine resins. Such polyols, which can also be employed as a mixture, are described for example in DE-A 31 24 784 and in EP-As 128 880 and 189 728.

Preferred polyols are epoxy resin polyols, polyester-polyols, polyurethane-polyols, polyether-polyols and acrylate resin polyols.

Synthetic resins (B) containing hydroxyl and amino groups are described in, for example, Journal of Coatings Technology, Vol. 54, No. 686, (1982), pp. 33 to 41 ("Polymer Compositions for Cationic Electrodepositable Coatings"), to which reference is made. Polymers which may be mentioned here are those comprising $\alpha,\beta$-olefinically unsaturated monomers containing hydroxyl and/or amino groups. The introduction of the hydroxyl and/or amino groups can be carried out using corresponding monomers in the copolymerization, for example hydroxy or amino esters of $\alpha,\beta$-olefinically unsaturated carboxylic acids, such as hydroxyalkyl (meth)acrylates or aminoalkyl (meth)acrylates, or by polymer-analogous reaction with diamines or polyamines, for example with N,N-dimethylaminopropylamine, to form amide, amino or urethane groups. A further group comprises the polyamino polyamides which are obtainable from dimerized fatty acids and polyamines, or the amino polyether polyols which are accessible, for example, by reacting epoxy resins with primary or secondary amines, and are particularly suitable. The latter are accessible by, for example, reacting primary or secondary amines with a polyglycidyl ether. The number of epoxide groups present here should be such that all the amino groups are converted to tertiary amino groups. The preferred polyglycidyl ethers are polyglycidyl ethers of bisphenol A and similar polyphenols. They can be prepared by, for example, etherifying a polyphenol with an epihalohydrin, such as epichlorohydrin, in the presence of an alkali.

Instead of the polyglycidyl ethers, it is also possible to employ their reaction products with $CO_2$. These products contain cyclic carbonate groups, which can be reacted with primary amines to form urethanes. Depending on the molar ratios of polyglycidyl ether to $CO_2$, the reaction with $CO_2$ yields compounds containing no remaining epoxide groups or compounds containing epoxide groups and cyclic carbonate groups. These cyclic carbonate groups can also be introduced into the polymer chain via corresponding monomers containing these groups; in this context see DE 36 44 372 and 36 44 373. The reaction of such polymers containing cyclic carbonate groups with amines to form so-called aminourethanes is described in, for example, EP 234 395 and 247 506 and in DE 36 44 370.

The polyglycidyl ethers of the polyphenols or their reaction products with $CO_2$ can be brought as they are to reaction with the amines, but it is frequently advantageous to react some of the reactive epoxide groups with a modifying material, in order to improve film properties. Particularly preferred is the reaction of the epoxide groups with a polyol, a polycarboxylic acid or a polyamine. This modification is preferably carried out before the reaction of the polyglycidyl ethers, or of their reaction products with $CO_2$, with the primary or secondary amines. However, it is also possible to select the ratio between the polyglycidyl ether used as startling material and the amines such that an excess of epoxide groups is present. The epoxide groups can then be reacted with the polycarboxylic acids or polyols. It is also possible to further modify the end product, which contains no remaining epoxide groups, by reacting the hydroxyl groups with glycidyl ethers.

For use in electrodeposition coatings, the number of basic groups in the binder should be selected so as to ensure adequate dilutability in water in acid medium.

The curing of these binders is preferably carried out by reaction with so-called curing agents in the form of partially blocked polyisocyanates.

The polyisocyanates employed can be any of those known in the polyurethane and/or coatings field, for example aliphatic, cycloaliphatic or aromatic polyisocyanates. Typical examples of the polyisocyanates used are 2,4- or 2,6-tolylene diisocyanates, xylylene diisocyanate, diphenylmethane 4,4'-diisocyanate, triphenylmethane triisocyanate, polyphenylpolymethyl isocyanate, hexamethylene diisocyanate and tri- and tetramethylhexamethylene diisocyanate, 2,2,4- (2,4,4-)methylcyclohexyl diisocyanate, isophorone diisocyanate, dicyclohexylmethyl diisocyanate, diethylfumarohexyl isocyanate, bis(3-methyl-4-isocyanatocyclohexyl)methane, 2,2-bis(4-isocyanatocyclohexyl)propane, the methyl ester of lysine diisocyanate, the biuret of hexamethylene diisocyanate, diisocyanates of dimeric acids, 1-methylbenzene 2,4,5-triisocyanate, biphenyl 2,4,4'-triisocyanate and the triisocyanate of 3 mol of hexamethylene diisocyanate and 1 mol of water with an NCO content of 16%.

In addition to these simple polyisocyanates, those containing heteroatoms in the radical linking the isocyanate groups are also suitable. Examples of these are polyisocyanates containing carbodiimide groups, allophanate groups, isocyanurate groups, urethane groups, acylated urea groups or biuret groups.

Finally, suitable polyisocyanates also include the known prepolymers containing terminal isocyanate groups, which are accessible in particular by reacting the abovementioned simple polyisocyanates, especially diisocyanates, with excess amounts of organic compounds having at least two groups which are reactive towards isocyanate groups. Further suitable polyisocyanates are described in, for example, DE 36 44 372. Mixtures of the various polyisocyanates can also be used.

Suitable blocking agents are aliphatic, cycloaliphatic or alkylaromatic (monohydric) alcohols, for example lower aliphatic alcohols such as methyl and ethyl alcohol, the various propyl, butyl and hexyl alcohols, heptyl alcohol, octyl alcohol, nonyl alcohol and decyl alcohol and the like, and furthermore unsaturated alcohols such as propargyl and allyl alcohols, cycloaliphatic alcohols such as cyclopentanol and cyclohexanol, alkylaromatic alcohols such as benzyl alcohol, methyl- and p-methoxy and p-nitrobenzyl-alcohol, α-hydroxyalkylpyridines, furfuryl alcohol, and monoethers of glycols, such as ethylene glycol monoethyl ether and monobutyl ether, methoxypropanol, 3-methyl-3-methoxybutanol and the like. Further blocking agents are ketoximes, expediently those having 3 to 20 carbon atoms, preferably 3 to 10 carbon atoms, such as acetone oxime, methyl ethyl ketone oxime (=butanone oxime), hexanone oxime (as methyl butyl ketone oxime), heptanone oxime (as methyl-n-amyl ketone oxime), octanone oxime and cyclohexanone oxime; also suitable are CH-acid compounds such as alkyl malonates, acetoacetates and cyanoacetates having in each case 1 to 4 carbon atoms in the ester group, NH-acid compounds such as caprolactam, and amino-alcohols like dimethylethanol amine or diethylethanolamine. These amino-alcohols can, for example, also be used as a mixture with the other blocking agents indicated, for example in amounts of up to 25 mol %, in particular 6-12 mol %, based on the mixture. The known blocking agent phenol can be employed in particular in those cases in which the reaction product is used for the preparation of non-aqueous coatings.

The ratio of curing agent to binder is governed by the desired crosslinking density and depends on the functionality of the curing agent (i.e. the total amount of crosslinking, blocked isocyanate groups, a proportion of which may also be incorporated via the binder) and on the functionality of the binder (number of hydroxyl and/or amino groups). In general, the amount of curing agent is from 5 to 85% by weight, preferably 25 to 48% by weight, based on the sum of curing agent and binder.

The conventional coatings solvents are suitable diluents. However, water is preferred for this purpose, in a mixture with organic solvents if appropriate. For aqueous systems of this type, which are used preferably as electrodeposition coatings, it is advantageous partially or completely to neutralize the basic amino groups, in order thereby to obtain coating formulations which can be electrically deposited from aqueous solution at a bath pH of between about 3 and 9. The neutralization of the basic groups is in general carried out using water-soluble acids, for example formic acid, acetic acid, lactic acid or phosphoric acid, or corresponding mixtures. The amount of acid in each individual case depends on the properties of the resin used and the neutralization is generally only carried out until the resin is solubilized or converted to a stable aqueous emulsion (or dispersion). This generally necessitates degrees of neutralization (DN) of 20 to 70%.

The solids contents of the electrodeposition coating are in general from 10 to 30% by weight.

Conventional additives which may possibly be present in the curable mixture according to the invention and which may be mentioned here are - depending on the particular intended use - the conventional coatings additives, such as pigments (iron oxides, lead oxides, lead silicates, titanium dioxide, barium sulfate, zinc oxide, zinc sulfide, phthalocyanine complexes etc.), pigment pastes, antioxidants, (UV) stabilizers, leveling and thickening agents, antifoams and/or wetting agents, reactive diluents, fillers (talc, mica, kaolin, chalk, quartz powder, asbestos powder, slate flour, various silicic acids, silicates etc.) and the like. These additives may if appropriate only be added to the mixture immediately prior to processing.

EXAMPLES

All quantities are in parts by weight (P).

1. Preparation of the organotin compounds:

1.1.

498 P (2 mol) of dibutyltin oxide* are mixed with 228 P of bisphenol A (1 mol) and 484 P of methyl isobutyl ketone and slowly heated to 90° C. The mixture becomes homogenous and highly viscous. The water of reaction which forms (18 P) is removed in circulation and the temperature is raised to from 100° to 120° C. When reaction is complete the mixture is cooled, and the reaction product obtained as a fine powder is freed of solvent and washed several times with a total of 300 P of ethyl acetate.

*(Fascat 4201 from ATO-Chem, Deutschland GmbH, Düsseldorf, approximately 47.7% of metallic tin)

Yield: 98%; content of metallic tin (determined as SnO$_2$ via the ash residue): 33.0±0.3%; m.p.=no change up to 200° C.

1.2.

In analogy to Example 1.1., 249 P of dibutyltin oxide (1 mol) and 228 P of bisphenol A (1 mol) in 318 P of methyl isobutyl ketone were brought to reaction (18 P of H$_2$O) and worked up.

Yield: 72%; content of metallic tin: 33.5±0.3%

1.3.

In analogy to Example 1.1., 498 P of dibutyltin oxide (2 mol) with 140 P of resorcinol (1 mol) in 425 P of methyl isobutyl ketone were brought to reaction (18 P of H$_2$O) and worked up.

Yield: 98%; content of metallic tin: 40.0±0.3%; m.p.=no change up to 200° C.

1.4.

A) 102 P of N,N-dimethylpropane-1,3-diamine (1 mol) are added slowly to 244 P of 2,2-bis(4-hydroxyphenyl)acetic acid (1 mol) in 230 P of methyl isobutyl ketone at 20°-35° C. with cooling. The temperature is then raised to 100°-120° C. and the water of reaction (18 P) is removed in circulation. When reaction is complete the batch is cooled to 20-25° C.

B) The reaction product obtained in 1.4. A) is heated at 90°-100° C. after addition of 790 P of methyl isobutyl ketone, 188 P of phenol (2 mol) and then 996 P of dibutyltin oxide (4 mol). The water of reaction (36 P) which forms is removed in circulation, and the temperature in the concluding phase can be raised to about 120° C. The mixture is then cooled, freed from MiBK and washed with 600 P of ethyl acetate in portions.

Yield: 92%; content of metallic tin: 32.0±0.3%; m.p.=no change up to 200° C.

C) The reaction product obtained in 1.4. B) is stirred with 339 P of butylglycol, cooled (20°-35° C.) and treated with 248 P of aqueous lactic acid (25% strength) (50.8=meq) in portions. 1450 P of deionized water are then added slowly with thorough stirring at 30°-50° C. The 40% aqueous emulsion obtained is stable and virtually clear.

(Content of metallic tin: 12.8±0.2% in 40% dispersion)

2. Preparation of the pigment paste 2.1. for comparison purposes

A paste binder was prepared in accordance with Example 2 of AT Patent 380 264. For this purpose 320 parts of an epoxy resin based on polypropylene glycol (equivalent weight approximately 320) are reacted in a reaction vessel at 75° to 80° C. with 134 P of tallow fatty amine and 52 P of diethylaminopropylamine to an epoxide value of 0. Following addition of 30 P of paraformaldehyde (91%), 19 P of water of reaction were stripped off using mineral spirits (b.p.=80° to 120° C.) and the entraining agent was subsequently removed by vacuum distillation. The batch was then adjusted with butylglycol to a solids content of 55% (1 h, 125° C.).

The paste resin thus obtained was then processed with the other components of the recipe below according to the procedure described in German Patent Application P 37 26 497.4 and 39 40 781 to give a pigment paste (paste A-D):

|  | A<br>0.5% Sn/<br>b.s. (bath) | B<br>1.0% Sn/<br>b.s. (bath) | C<br>1.5% Sn/<br>b.s. (bath) | D<br>Control blank |
| --- | --- | --- | --- | --- |
| 1. Pigment paste resin/55% | 14.29P | 14.29P | 14.29P | 14.29P |
| 2. Acetic acid/50% aqueous | 0.85P | 0.85P | 0.85P | 0.85P |
| 3. Surfynol 104/sec-butanol(1:1) | 1.50P | 1.50P | 1.50P | 1.50P |
| 4. Dibutyltin oxide | 1.24P | 2.47P | 3.70P | — |
| 5. Lead silicate EP 202 | 4.04P | 4.04P | 4.04P | 4.04P |
| 6. Carbon black Printex 25 | 0.41P | 0.39P | 0.37P | 0.37P |
| 7. TiO$_2$ RSE 50 | 41.45P | 40.22P | 38.99P | 42.69P |
| 8. Deionized water | 36.22P | 36.22P | 36.22P | 36.22P |
|  | 100.00P | 100.00P | 100.00P | 100.00P |

Solids content (1 h, 125° C.) = 55%, PBR = 6:1
b.s. = binder solids
PBR = pigment/binder ratio Item 1. is placed in a vessel and then items 2. to 4. are added with stirring (dissolver) and the mixture is stirred for 8 hours at 40°-50° C. Then items 5. to 8. are added and left to soak in for at least 8 hours. Subsequently SAZ beads ($\phi$ 2 mm) are added and the batch is milled in a jacketed (coolable) stirred vessel (for about 1-2 hours) until an average particle size of <2 μm is reached (temperature <60° C.).

2.2. with the catalysts according to the invention as in Examples 1.1. to 1.4.B):

In analogy to Example 2.1. and with the pigment paste resin described therein, pigment pastes according to the recipe below were prepared:

|  | A<br>0.5% Sn/<br>b.s. (bath) |  | B<br>1.0% Sn/<br>b.s. (bath) |  | C<br>1.5% Sn/<br>b.s. (bath) |  |  |
| --- | --- | --- | --- | --- | --- | --- | --- |
| 1. Pigment paste resin/55% |  | 14.29P |  | 14.29P |  | 14.29P |  |
| 2. Acetic acid/50%, aqueous |  | 0.85P |  | 0.85P |  | 0.85P | Catalyst |
| 3. Surfynol/sec-butanol(1:1) |  | 1.50P |  | 1.50P |  | 1.50P | Example |
| 4. Tin catalyst | a | 1.76P | a | 3.52P | a | 5.28P | 1.1 |
|  | b | 1.76P | b | 3.52P | b | 5.28P | 1.2 |
|  | c | 1.59P | c | 3.19P | c | 4.78P | 1.3 |
|  | d | 1.84P | d | 3.69P | d | 5.53P | 1.4 B) |
| 5. Lead silicate EP 202 |  | 4.04P |  | 4.04P |  | 4.04P |  |
| 6. Carbon black Printex 25 |  | 0.41P |  | 0.39P |  | 0.37P |  |

-continued

| | A<br>0.5% Sn/<br>b.s. (bath) | | B<br>1.0% Sn/<br>b.s. (bath) | | C<br>1.5% Sn/<br>b.s. (bath) | |
| --- | --- | --- | --- | --- | --- | --- |
| 7. TiO₂ RSE 50 | a | 40.93P | a | 39.19P | a | 37.45P |
| | b | 40.93P | b | 39.19P | b | 37.45P |
| | c | 41.10P | c | 39.52P | c | 37.95P |
| | d | 40.85P | d | 39.02P | d | 37.20P |
| 8. Deionized water | | 36.22P | | 36.22P | | 36.22P |
| | | 100.00P | | 100.00P | | 100.00P | 100.00P |

Solids content (1 h, 125° C.) = 55%, PBR = 6:1

Item 1. is placed in a vessel and then items 2. to 8. are added with stirring (dissolver) and left to soak in for at least 8 hours. Then SAZ beads ®(ϕ about 2 mm) are added and the batch is milled in a jacketed (coolable) stirred vessel (about 1-2 hours) until an average particle size of <2 μm is reached (temperature <60° C.).

All the pastes (Examples 2.1. and 2.2.) then have the beads removed using a sieve and before being used in the coating formulation are filtered through a Perlon sieve (mesh size 30 μm).

3. Preparation of the coating binders

3.1. Preparation of the blocked polyisocyanates

A) 124 parts (1.05 mol) of butylglycol and 0.3 part of dibutyltin laurate (DBTL) were run in over 60-120 min to 174 parts of Desmodur®T 80 (80% 2,4- and 20% 2,6- tolylene diisocyanate; about 1 mol) at 40°-60° C. and then held at this temperature until a % NCO value of about 12.8-13.5 was reached.

B) 42.4 parts of trimethylolpropane were introduced in portions to 298 parts of the compound A) in 38 parts of toluene and reacted at 80°-100° C. to a % NCO value of virtually zero. The batch is then adjusted with 189 P of methoxypropanol to a solids content of about 60% (about 51% TDI based on solids).

3.2. Preparation of the binder hydroxyl component

In analogy to EP-A 86, Example 31, an epoxide-amine adduct was prepared as follows:

210 parts of diethanolamine, 102 parts of N,N-dimethylamminopropylamine and 636 parts of an adduct of 1 mol of 2-methylpentamethylenediamine and 2 mol of Versatic acid glycidyl ester (Cardura®E 10) were added to 3400 parts of bisphenol A epoxy resin (equivalent weight about 480) in 2341 parts of methoxypropan-2-ol (about 65%). The reaction mixture was held for 4 hours with stirring at 60° to 90° C. and then for one hour at 120° C.

Hydroxyl no.: approximately 155 mg of KOH/g of solid resin

Amine number: approximately 77 mg of KOH/g of solid resin

3.2.1. Preparation of a binder amino component

608 P of a carbonate based on Cardura E 10, 2096 P of a biscarbonate based on a bisphenol A epoxy resin with an equivalent weight of about 524 (or 480 based on epoxide groups) are reacted in 2098 P of toluene with 1192 P of compound 3.1.A.) at 40°-60° C. to a % NCO value of <0.2. The batch is then diluted with 321 P of methoxypropanol and reacted at 60°-80° C. with 623.5 P of bishexamethyienetriamine (2.9 mol) to an amine number of 36 mg of KOH/g of solid resin (approximately 65% solids content, about 15.5% TDI).

3.3. Preparation of the binder dispersion

C parts of binder amino component 3.2.1., and A parts of binder hydroxyl component/65% (3.2.) were mixed with B parts of curing agent solution/60% (3.1.), 5 parts of Texanol, 2 parts of 2-ethylhexanol and 3.22 parts of 50% strength aqueous formic acid (about 35 meq) and concentrated under vacuum (up to 20mbar) at temperatures of up to 80° C. to a solids content of 85-90%. Subsequently, using 139 parts of deionized water and with thorough stirring, an approximately 40% dispersion was prepared and filtered through a Perlon sieve (mesh size 30 μm).

| | Parts | | | | (in % NCO)<br>deblocking |
| --- | --- | --- | --- | --- | --- |
| Example | A | B | C | % TDI | urethane |
| 3.3.1. | 118.3 | 38.5 | — | 11.80 | 2.85 |
| 3.3.2. | 77.0 | 33.3 | 46.0 | 14.85 | 3.58 |

4. Coating formulation/test combinations 3000 parts of binder dispersion/40% (as in Examples 3.3.1. and 3.3.2.) are diluted with stirring to a solids content of approximately 25%, using 1800 parts of deionized water. This clearcoat solution is mixed with 1091 parts of pigment paste (as in Examples 2.1. and 2.2.) and about 12.8 parts of 50% formic acid. The batch is then adjusted to a solids content of about 18% using deionized water (PBR about 0.4:1).

In the case of coating formulation 4.21., pigment paste 2.1.D. is added and after addition of the formic acid, 100 parts of the catalyst emulsion as in Example 1.4.C. are added.

Application as electrodeposition coating

The coating formulations were subjected to cataphoretic deposition in an open glass vessel. The cathode used was zinc-phosphatized steel plate and the anode, at a distance of 5 to 10 cm from the cathode, was bright-annealed steel plate. The bath temperature was 32° C. and the duration of deposition was 2 min. Stirring was carried out using a Teflon-coated magnetic stirrer rod.

The film thicknesses obtained in each case and the properties of the deposited and subsequently cured films (stoving conditions: 20 min at oven temperature) are given in summarized form in the table below:

| | | Test combinations: | | |
| --- | --- | --- | --- | --- |
| Coating<br>Example | Binder<br>dispersion | % Sn based<br>on b.s. | Pigment<br>paste | |
| 4.1. | 3.3.1. | 0.5 | 2.1.A. | |
| 4.2. | 3.3.1. | 1.0 | 2.1.B. | |
| 4.3. | 3.3.1. | 1.5 | 2.1.C. | Comparative |
| 4.4. | 3.3.2. | 0.5 | 2.1.A. | examples |

-continued

| Coating Example | Binder dispersion | % Sn based on b.s. | Pigment paste | |
|---|---|---|---|---|
| 4.5. | 3.3.2. | 1.0 | 2.1.B. | |
| 4.6. | 3.3.2. | 1.5 | 2.1.C. | |
| 4.7. | 3.3.1. | 0.5 | 2.2.A.a. | |
| 4.8. | 3.3.1. | 1.0 | 2.2.B.a. | |
| 4.9. | 3.3.1. | 1.5 | 2.2.C.a. | Catalyst |
| 4.10. | 3.3.2. | 0.5 | 2.2.A.a. | 1.1. |
| 4.11. | 3.3.2. | 1.0 | 2.2.B.a. | |
| 4.12. | 3.3.2. | 1.5 | 2.2.C.a. | |
| 4.13. | 3.3.1. | 0.5 | 2.2.A.b. | Catalyst |
| 4.14. | 3.3.1. | 1.0 | 2.2.B.b. | 1.2. |
| 4.15. | 3.3.1. | 0.5 | 2.2.A.c. | |
| 4.16. | 3.3.1. | 1.0 | 2.2.B.c. | |
| 4.17. | 3.3.1. | 1.5 | 2.2.C.c. | Catalyst |
| 4.18. | 3.3.2. | 0.5 | 2.2.A.c. | 1.3. |
| 4.19. | 3.3.2. | 1.0 | 2.2.B.c. | |
| 4.20. | 3.3.2. | 1.5 | 2.2.C.c. | |
| 4.21. | 3.3.1. | 1.0 | 2.1.D. | Catalyst 1.4.C. |

Test results:

Stoving temperature: 165° C., stoving time: 20 min. Layer thicknesses of the stoved coatings: 20–22 μm

| Coating Example | Acetone test [s] | Indentation* after 1 week/ 4 weeks [inch · pound] | Indentation** after 1 week/ 4 weeks [inch · pound] | Screen oversize after 1 week/ 4 weeks [mg/l] |
|---|---|---|---|---|
| 4.1 | <5 | —/— | —/— | <5/20 |
| 4.2 | 15 | —/— | —/— | 8/28 |
| 4.3 | >120 | 100/80 | 40/4 | 20/67 |
| 4.4 | <5 | —/— | —/— | 6/18 |
| 4.5 | 30 | —/— | —/— | 5/33 |
| 4.6 | >120 | 100/100 | 40/10 | 30/85 |
| 4.7 | 30 | —/— | —/— | <5/<5 |
| 4.8 | >120 | 140/140 | 60/60 | <5/20 |
| 4.9 | >120 | 140/160 | 60/60 | <5/22 |
| 4.10 | 30 | —/— | —/— | <5/<5 |
| 4.11 | >120 | 140/140 | 60/60 | <5/12 |
| 4.12 | >120 | 140/160 | 60/60 | <5/15 |
| 4.13 | 30 | —/— | —/— | <5/15 |
| 4.14 | >120 | 100/80 | —/— | 15/38 |
| 4.15 | <5 | —/— | —/— | <5/12 |
| 4.16 | 15 | —/— | —/— | 7/18 |
| 4.17 | >120 | 100/80 | —/— | 13/29 |
| 4.18 | <5 | —/— | —/— | <5/12 |
| 4.19 | 15 | —/— | —/— | 5/18 |
| 4.20 | >120 | 140/120 | —/— | 12/25 |
| 4.21 | >120 | 100/100 | 60/60 | 10/28 |

*determined in accordance with ASTM D 2794; tested only on cured coats; test temperature: *20° C. (**−20° C.); 1 inch · pound = 1.152 · 10$^{-2}$ m · kg The screen oversize and the acetone test were determined and carried out, respectively, as follows:

Screen oversize 1 l of the dilute coating solution was poured through a weighed Perlon sieve (mesh size 30 μm). The sieve was then rinsed with deionized water and, after drying (1 h/125° C.), weighed. The difference in the two weighings gives the screen oversize in mg per 1000 ml of bath.

Acetone test

The coated sheets are stoved for 20 min (circulating-air oven; for temperature see examples). The surface of the coating is then subjected at 20° to 25° C. to a cotton-wool pad about 1 cm³ in size and impregnated with acetone. The acetone which evaporates is supplemented via a pipette, not continuously but at short intervals (about 20 to 30 s). At 15 s intervals during this treatment, the complete curing of the film is tested with a fingernail at the affected area. The time indicated corresponds to the point at which damage first occurs to the surface, as a function of the stoving temperature (maximum test duration 2 min).

Comparative results in accordance with EP 0 261 486

As a comparison to the reaction products of dibutyltin oxide with polyphenols claimed in the present application, the catalysts K1 (DBTO with nonylphenol, 26% metallic Sn) and K2 (DBTO with 2-ethylhexanol, 24% metallic Sn) described in EP 0 261 486 were prepared. Using these catalysts the following pigment pastes were formulated:

| K 1 | A 0.5% Sn/ b.s. (bath) | B 1.0% Sn/ b.s. (bath) | C 1.5% Sn/ b.s. (bath) |
|---|---|---|---|
| Pigment paste resin/55% | 14.29 P | 14.29 P | 14.29 P |
| Acetic acid/50% | 0.85 P | 0.85 P | 0.85 P |
| Surfynol/sec-butanol (1:1) | 1.50 P | 1.50 P | 1.50 P |
| Tin catalyst K1 | 2.23 P | 4.46 P | 6.69 P |
| Lead-silicate EP 202 | 4.04 P | 4.04 P | 4.04 P |
| Carbon black Printex 25 | 0.40 P | 0.38 P | 0.36 P |
| TiO$_2$ RSE 50 | 40.47 P | 38.26 P | 36.05 P |
| Deionized water | 36.22 P | 36.22 P | 36.22 P |

| K 2 | A 0.5% Sn/ b.s. (bath) | B 1.0% Sn/ b.s. (bath) | C 1.5% Sn/ b.s. (bath) |
|---|---|---|---|
| Pigment paste resin/55% | 14.29 P | 14.29 P | 14.29 P |
| Acetic acid/50% | 0.85 P | 0.85 P | 0.85 P |
| Surfynol/sec-butanol (1:1) | 1.50 P | 1.50 P | 1.50 P |
| Tin catalyst K2 | 2.42 P | 4.84 P | 7.26 P |
| Lead-silicate EP 202 | 4.04 P | 4.04 P | 4.04 P |
| Carbon black Printex 25 | 0.40 P | 0.38 P | 0.36 P |
| TiO$_2$ RSE 50 | 40.28 P | 37.88 P | 35.48 P |
| Deionized water | 36.22 P | 36.22 P | 36.22 P |

Using these pigment pastes and the binder dispersions 3.3.1. and 3.3.2., the following test combinations were formulated:

| Coating Example | Binder dispersion | % Sn based on b.s. | Pigment paste |
|---|---|---|---|
| 4.22. | 3.3.1. | 0.5 | K1A |
| 4.23. | 3.3.1. | 1.0 | K1B |
| 4.24. | 3.3.1. | 1.5 | K1C |
| 4.25. | 3.3.2. | 0.5 | K1A |
| 4.26. | 3.3.2. | 1.0 | K1B |
| 4.27. | 3.3.2. | 1.5 | K1C |
| 4.28. | 3.3.1. | 0.5 | K2A |
| 4.29. | 3.3.1. | 1.0 | K2B |
| 4.30. | 3.3.1. | 1.5 | K2C |
| 4.31. | 3.3.2. | 0.5 | K2A |
| 4.32. | 3.3.2. | 1.0 | K2B |
| 4.33. | 3.3.2. | 1.5 | K2C |

With these coating examples the following results were obtained:

| Coating Example | Acetone test [s] | Identation* after 1 week/ 4 weeks [inch · pound] | Identation** after 1 week/ 4 weeks [inch · pound] | Screen oversize after 1 week/ 4 weeks [mg/l] |
| --- | --- | --- | --- | --- |
| 4.22. | <5 | —/— | —/— | <5/16 |
| 4.23. | 15 | —/— | —/— | <5/23 |
| 4.24. | >120 | 80/80 | 80/4 | 25/150 |
| 4.25. | <5 | —/— | —/— | <5/<5 |
| 4.26. | 30 | —/— | —/— | 25/29 |
| 4.27. | >120 | 100/100 | 40/20 | 33/68 |
| 4.28. | <5 | —/— | —/— | <5/30 |
| 4.29. | <5 | —/— | —/— | 14/25 |
| 4.30. | 30 | —/— | —/— | 27/75 |
| 4.31. | <5 | —/— | —/— | <5/11 |
| 4.32. | <5 | —/— | —/— | 10/52 |
| 4.33. | 30 | —/— | —/— | 15/58 |

*determined in accordance with ASTM; tested only on cured coats; test temperature: *20° C. (**—20° C.); 1 and 4 weeks respectively relates to the aged bath. ASTM D 2794 1 inch · pound = $1.152 \cdot 10^{-2}$ m · kg The results obtained indicate a significant advantage of the catalysts according to the invention in relation to the comparative products or the unreacted dibutyltin oxide. The advantage consists, apart from the greater simplicity of incorporation into the pigment paste, in a better consistency over time of the effectiveness of the tin catalysts according to the invention and their improved efficiency, i.e. lower application amount in order to achieve full curing of the coatings.

We claim:

1. A reaction product of a dialkyltin oxide and a polyhydric phenol selected from the group consisting of

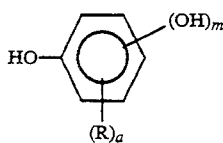

(I)

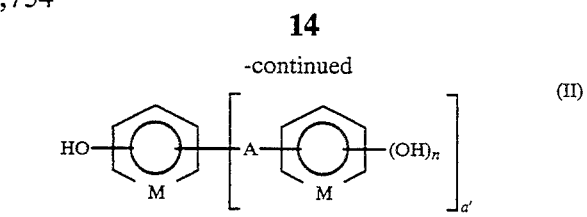

(II)

wherein R is selected from the group consisting of alkyl of 1 to 18 carbon atoms, phenyl, alkylphenyl of 1 to 18 alkyl carbon atoms and cycloalkyl of 5 to 6 carbon atoms, m is an integer from 0 to 5, a is an integer from 0 to 7, a being less than or equal to 5-m, n and a' are 1 or 2, M is C, A is selected from the group consisting of —SO—, —S—, —SO$_2$—, —S—S— and —CO—.

2. A reaction product as claimed in claim 1, wherein the polyhydric phenol is a compound of the formula I

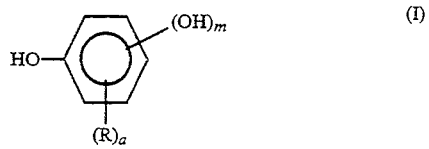

(I)

in which
R is C$_1$-C$_{18}$-alkyl, phenyl, C$_1$-C$_{18}$-alkylphenyl or C$_5$-C$_6$-cycloalkyl,
m is a number from 1 to 5, and
a is a number from zero to 4, the value of a being less than or equal to the difference from 5 minus m.

3. A reaction product as claimed in claim 1 wherein the polyhydric phenol is a compound of the formula II

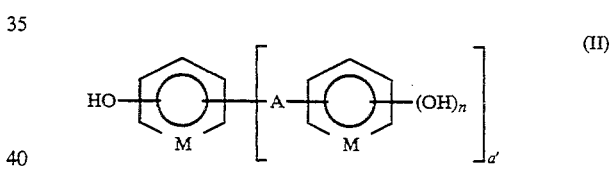

(II)

where
n and a' are 1 or 2,
M is C,
A is a member selected from the group consisting of —SO$_2$—, —S—S—, and —CO—,

* * * * *